United States Patent
Lei (10) Patent No.: US 7,365,800 B2
(45) Date of Patent: Apr. 29, 2008

(54) METHOD FOR PRE-PROCESSING IMAGE DATA

(75) Inventor: Zhichun Lei, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 450 days.

(21) Appl. No.: 10/902,560

(22) Filed: Jul. 29, 2004

(65) Prior Publication Data

US 2005/0062897 A1    Mar. 24, 2005

(30) Foreign Application Priority Data

Aug. 1, 2003    (EP) ................... 03017481

(51) Int. Cl.
*H04N 5/40*    (2006.01)

(52) U.S. Cl. ................... 348/608

(58) Field of Classification Search ........ 348/606–608, 348/610, 448, 470; 375/297
See application file for complete search history.

(56) References Cited

U.S. PATENT DOCUMENTS

| 5,185,663 | A  * | 2/1993  | Hackett ................ 348/448 |
| 5,276,519 | A    | 1/1994  | Richards et al. |
| 5,517,247 | A  * | 5/1996  | Correa et al. ........... 348/448 |
| 5,923,712 | A  * | 7/1999  | Leyendecker et al. ...... 375/297 |
| 6,141,390 | A  * | 10/2000 | Cova ................... 375/297 |
| 6,246,865 | B1 * | 6/2001  | Lee ................... 455/114.3 |
| 6,272,326 | B1 * | 8/2001  | Shinde ................ 455/127.1 |
| 6,281,936 | B1 * | 8/2001  | Twitchell et al. ......... 348/470 |
| 6,298,097 | B1 * | 10/2001 | Shalom ................ 375/297 |
| 6,377,116 | B1 * | 4/2002  | Mattsson et al. ........... 330/2 |
| 6,538,691 | B1   | 3/2003  | Macy et al. |
| 6,600,792 | B2 * | 7/2003  | Antonio et al. .......... 375/297 |
| 7,091,779 | B2 * | 8/2006  | Sahlman ............... 330/149 |
| 2003/0043303 | A1 * | 3/2003 | Karuta et al. ........... 348/744 |
| 2006/0280376 | A1 * | 12/2006 | Lei .................... 382/275 |

FOREIGN PATENT DOCUMENTS

| EP | 1 330 131   | 7/2003 |
| JP | 2002-122511 | 4/2002 |
| JP | 2003-131640 | 5/2003 |
| WO | WO 01/71665 | 9/2001 |

OTHER PUBLICATIONS

Boone J M et al: "Analysis and Correction of Imperfections in the Image Intensifier-TV-Digitizer Imaging Chain" Medical Physics, American Institute of Physics, New York, US, vol. 18, No. 2, Mar. 1, 1991, pp. 236-242, XP000228810.

* cited by examiner

*Primary Examiner*—Paulos M. Natnael
(74) *Attorney, Agent, or Firm*—Oblon, Spivak, McClelland, Maier & Neustadt, P.C.

(57) ABSTRACT

A method for pre-processing image data, including steps of: receiving primary image data corresponding to an image or a sequence of images to be displayed; pre-processing the primary image data by applying a pre-distortion operation to the primary image data so as to obtain secondary image data; and outputting the secondary image data to a display process as data to be displayed, wherein the pre-distortion operation is configured to correspond to an inverse (IDO) of a distortion operation of a display process to be used for displaying the secondary image data and the pre-distortion operation is designed to describe parameters for sharpness, contrast, brightness or color of a display device.

26 Claims, 4 Drawing Sheets

METHOD FOR PRE-PROCESSING IMAGE DATA

The present invention relates to a method for pre-processing image data and in particular to a method for pre-processing image data which is capable of compensating non-uniform imaging properties of further processing steps and/or of display devices in a simple and reliable manner.

One major assumption within the design of methods for processing image data and/or within apparatuses and methods for displaying images was a one-to-one and uniform relationship between the original image data to be displayed and the displayed image which is shown on a screen or the like. However, it turned out that the further processing steps and/or the steps of displaying an image and/or the device for displaying the image, in particular the screen or the like, induce according to its own characteristics, certain non-uniform properties with respect to certain parameters which were assumed to be uniform. Known approaches to overcome and to compensate for these non-uniform properties increase the burden in the processing steps with respect to the computational load and/or with respect to the respective electronic components.

It is an object of the present invention to provide a method for pre-processing image data and a system and an apparatus to realize such a method that can guarantee a reliable non-uniformity compensation of the image data to be displayed in a particular simple way.

This object is achieved by a method for pre-processing image data according to the features of independent claim 1. Preferred embodiments of the inventive method for pre-processing image data are defined in the dependent sub claims. The object is further achieved by a system, apparatus or device for processing image data according to independent claim 12, by a computer program product according to independent claim 16, as well as by a computer readable storage medium according to independent claim 17.

The inventive method for pre-processing image data comprises steps of receiving primary image data, pre-processing said primary image data so as to obtain secondary image data, and providing and/or outputting said secondary image data. The received primary image data in particular correspond to and/or represent an image or a sequence of images to be displayed. The step of pre-processing said primary image data is performed by applying a pre-distortion operation to said primary image data. Thereby, secondary image data are produced. The step of providing and/or outputting said secondary image data is in particular done to provide said secondary image data to a display process and/or to an image generation process to be performed, in particular as data to be displayed as and/or as data to be transformed into said image to be displayed. According to the present invention, said pre-distortion operation is chosen, designed and/or adapted to at least essentially and/or approximately correspond to an inverse of a distortion operation of a display process and/or of an image generation process to be used for displaying said secondary image data and/or for transforming said secondary image data into said image to be displayed. Additionally or alternatively, said pre-distortion operation is chosen, designed and/or adapted to at least essentially and/or approximately correspond to an intentionally distorted form of a display process and/or of an image generation process to be used for displaying said secondary image data and/or for transforming said secondary image data into said image to be displayed.

It is therefore a basic aspect of the present invention to apply to image data to be displayed a pre-distortion operation that is at least essentially and/or approximately inverted with respect to a distortion operation of a display process to be performed and/or of an image generation process to be performed. Consequently, said pre-distortion operation of the pre-processing step of the inventive method and the distortion operation of the display process and/or the image generation process to follow at least partly or completely compensate and annihilate each other thereby compensating and avoiding an image distortion and a non-uniformity of the image to be displayed.

The image to be displayed may be a single image. On the other hand, also a sequence of images, for instance a video sequence or the like may be applied within the inventive method for pre-processing image data.

Additionally, the pre-distortion operation may take into account the distortion operation of the display process per se or of its sub-components, for instance, distortion operations that cannot be avoided during image processing or geometrical processing. Additionally, the pre-distortion operation may also compensate for non-uniformities that may be imposed by the imaging device, for instance, because of its manufacturing variances or errors.

According to a preferred embodiment of the inventive method for pre-processing image data said pre-distortion operation PDO and said distortion operation DO fulfill the relation $$DO \cdot PDO = id$$

and/or the relation $$DO \cdot PD = id,$$

with id denoting the identical operation and/or a desired operation, e.g. to match to the human perception and/or to the human visual system.

Additionally or alternatively, the inventive method for pre-processing image data and in particular the applied pre-distortion operation may be characterized according to a further advantageous embodiment of the invention in that said pre-distortion operation PDO and said distortion operation DO fulfill the relation $$PDO = IDO = DO^{-1}$$

and/or the relation $$PDO \approx IDO = DO^{-1},$$

with $DO^{-1}$ and IDO denoting the inverted operation with respect to said distortion operation DO.

It is of further advantage, if said pre-distortion operation is completely or in part based on and/or defined by a pre-distortion function in implicit or in explicit form. According to this particular measure, the pre-distortion operation can simply be defined and evaluated by using—in the simplest case—an explicit mathematical formula.

As an alternative, said pre-distortion operation may be completely or in part based on and/or defined by a pre-distortion lookup table. This is also a simple and less time consuming and computational burden avoiding approach for the case that storage requirements are not limited.

The information with respect to the pre-distortion operation and in particular with respect to the pre-distortion function may be built in the inventive method for pre-processing data as a prior knowledge.

On the other hand, a step of receiving, providing and/or generating said pre-distortion operation and/or in particular said pre-distortion function may be comprised by said method for pre-processing image data. This may be done by explicitly receive and provide said pre-distortion operation and/or said pre-distortion function. On the other hand, a pre-form of said pre-distortion operation and/or said pre-distortion function or more fundamental data implicitly describing said pre-distortion operation and/or said pre-distortion function may be received, provided and/or generated on the basis of which in a following step said pre-distortion operation and/or said pre-distortion function may be generated and constructed.

According to a further preferred embodiment of the present invention for pre-processing image data said step of providing and/or generating said pre-distortion operation and/or said pre-distortion function may be based on and use image distortion data which are descriptive for said distortion operation and/or for said distortion function of the step or process of displaying and/or of image generation to follow, wherein said image distortion data may be in particular obtained during a step of acquiring said image distortion data, which step may be in particular performed before said step of providing and/or generating said pre-distortion operation and/or said pre-distortion function.

According to a further alternative or additional embodiment of the inventive method for pre-processing image data said pre-distortion operation, said pre-distortion function and/or said image distortion data may be designed and/or chosen to describe global, sectional, and/or local parameters—in particular with respect to single pixels—for sharpness, contrast, brightness, color, geometry of a display process, and/or geometry of a display device and/or the like.

Additionally or alternatively, said pre-distortion operation, said pre-distortion function and/or said image distortion data may be determined by using at least one test function or test image, in particular represented by an increasing and/or decreasing staircase function on the basis of well-defined and predefined parameters.

As a further addition or alternative said pre-distortion operation, said pre-distortion function and/or said image distortion data may be determined by an objective measurement process, in particular within said step of acquiring said image distortion data.

Further additionally or alternatively, said pre-distortion operation, said pre-distortion function and/or said image distortion data may be determined by an iterative process and/or by a feedback process. This may be done automatically or by involving one or a plurality of users.

According to a further aspect of the present invention, a system, apparatus or device is provided for processing image data that are in each case adapted to realize and/or to perform the inventive method for pre-processing image data and/or the steps thereof.

According to a preferred embodiment of the inventive system, apparatus, or device for processing image data said method for pre-processing said image data is included within or performed together with a process of image processing, of geometrical processing, of image post-processing, of sharpness and/or of contrast enhancement processing and/or the like. This may be the case for the complete inventive method or for parts thereof.

Additionally a video display system and/or video display apparatus as well as a method for image processing, in particular for geometrical image processing, sharpness and/or contrast enhancement are provided according to the present invention which are according to the present invention characterized by a non-uniformity correction function or feature and/or spatial-varying enhancement function or feature, in particular with respect to different pictures areas, pixel positions, and/or different enhancement amounts.

It is a further aspect of the present invention to provide a computer program product comprising computer program means which is adapted and designed to realize and to perform the inventive method for pre-processing image data, the steps thereof and/or the system for processing image data when it is executed on a computer, a digital processing means, and/or the like.

Finally, the present invention provides a computer readable storage medium comprising the inventive computer program product.

In the following, the invention will be described in more detail on the basis of the following remarks:

The present invention particularly relates to a non-uniformity correction for video display processes and/or devices.

This invention application inter alia discloses methods to achieve a uniform performance across the whole screen of the display device in question, e.g. the left, central, and right part of a screen. It aims at both correcting the imperfect characteristics of the display device and enhancing the display device performance. The envisaged uniform performances are with respect to, for instance, brightness, sharpness, and contrast of a picture or a picture sequence. The basic idea of this approach is to pre-distort the picture to be displayed by means of the information, which is derived subjectively/objectively from a desired picture and its corresponding picture displayed without non-uniformity correction. Implementation method will also be taken into account by this invention application.

Some basic aspects of the technical field are described as follows:

Non-uniformity correction can be applied to detectors. Normally, a detector consists of a plurality of individual sensors, and each sensor can have a different gain. Different gain generates among others a new kind of noise, i.e. structural noise. Thus, gain correction is required to achieve a satisfying result. Methods for calculating gain correction factors in digital imaging systems may be used as gain correction methods in this field. A uniform (x-ray) exposure is applied to the detector in question. The detector output is collected and divided by the uniform input. As result, the gain factor of each sensor is obtained. The gain factors of all the sensors, often called gain map, are then stored in the image system so that the image data taken from application objects can be corrected. In this way, the structural noise can be removed or made invisible.

Instead of measuring a detector response of a x-ray input using only one intensity level, in methods for x-ray densitometry detector calibration by beam flattening and continuous dark scanning it is suggested that an automatic multi-position attenuator mechanism is inserted into the x-ray beam so that an effect is achieved that the x-ray has different intensity levels. Thus, gain can be estimated at multiple intensity levels. In case of zero intensity level, the detector response is used for the image offset correction.

Also methods for controlling a multi-screen display apparatus are suggested wherein a method to homogenize display performance is used. A large screen is composed of a plurality of (e.g. 4×4) display units. The characteristics of the display units can differ from each other. Thus, each display unit output is connected to a Look-Up-Table (LUT). The LUT coefficients are set in a way that they modify all these display units to the same input-output characteristics. As result, the large screen has a uniform brightness.

Methods and systems for compensating row-to-row brightness variations of a field emission display may involve methods to compensate for row-by-row brightness difference in a field emission device (FED), wherein a LUT is also applied. Special process, e.g. using a periodic measuring signal, is applied to measure the row-by-row brightness difference in a FED.

For Plasma and LCD (Liquid Crystal Display) devices, non-uniformity correction has also found application.

In the Context of plasma display devices a color correction method over the life expectancy of plasma display device may be applicable. When a plasma display device is driven for a long period, the color temperature of the initial setting is changed. This is due to the non-uniform deterioration of the red, green and blue fluorescent materials, which is caused by the ultraviolet rays generated for discharge. To solve this problem, a counter is used to count the elapsed time. The color temperature correction is done in accordance with the time counter. In fact, this patent application envisages correcting performance in time domain rather than in spatial domain of the display devices.

Non-Uniformity correction for displayed images may be realized by a method to make the LCD panel performance uniform. It envisages video application. Similar to the above-described situation, a uniform input is needed to determine the input-output characteristics. As input, an image rather than the x-ray exposure is applied.

For color correction in image display processes applying gain correction to color components of the pixels on different positions of the LCD panel may be applicable. One advantage of this method is that the difference in chromaticity is corrected, without any effort for making luminance values the same at all pixels.

Display brightness uniformity has also found application for the LCOS or Liquid Crystal on Silicon displays. Methods and apparatuses for realizing a uniform brightness in displays may envisage compensating for the variations in liquid crystal gap dimensions as well as digital-to-analog converter (DAC). The last non-uniformity correction is reasoned that a variable voltage transfer function is applied to the DAC. To achieve uniform brightness, the liquid crystal gap dimension across a LCOS has to be determined.

Some basic aspects of the present invention are described as follows:

The non-uniformity elimination is done by intentionally making the source picture non-uniform with respect to e.g. sharpness and contrast, i.e. pre-distorting the uniformity of the source picture regarding e.g. picture sharpness and contrast. Then, the pre-distorted picture is distorted again by the display device e.g. CRT device. It is required that the transfer function of the pre-distortion procedure is the inverse of that of the display device so that one can obtain a uniform picture or an intentionally distorted form thereof so that a performance is achieved that better matches the characteristics of the human perception and/or of the human visual system, e.g. with respect to the distance varying characteristics of the human perception and/or the human visual system.

Figure 1:
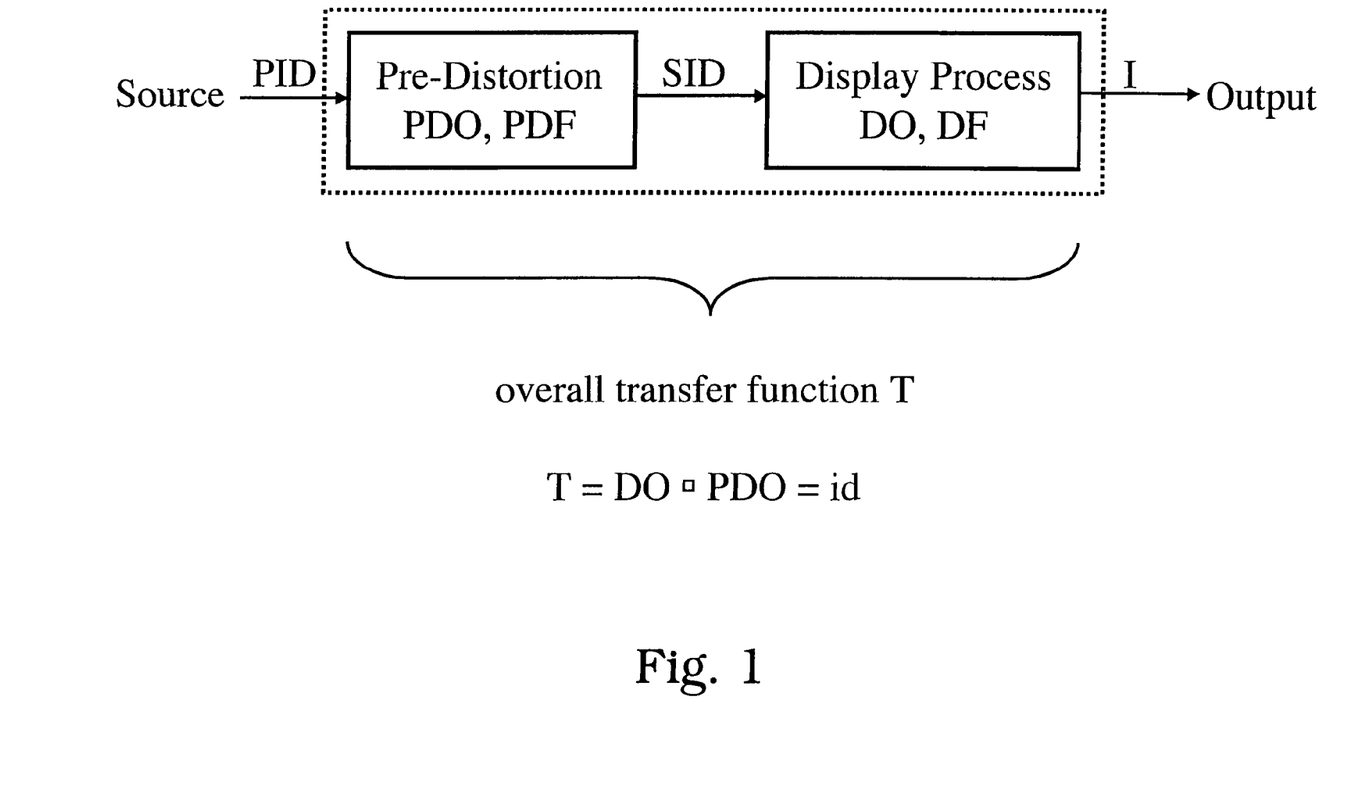
FIG. 1 is a schematical block diagram demonstrating some of the basic ideas of the present invention.

Its diagram is shown in FIG. 1. The pre-distortion transfer function can be derived objectively/subjectively from a desired picture and its corresponding picture displayed without non-uniformity correction. If one knows the distortion transfer function of the display device, one can simply obtain the pre-distortion transfer function. Thus, in the following, discussion is concentrated on deriving the distortion transfer function of the display device. Usually, the transfer function should enhance the picture regarding e.g. sharpness and contrast in picture border areas, such as the left and right part of a picture, and preferably keep the picture central region untouched.

At first, objective method for deriving the distortion transfer function will be discussed. For this purpose, one needs a test input signal. It is preferred to apply a measurement signal having one of the waveforms shown in FIGS. 3A and 3B. Here only the signal part in the active columns of an active TV scanning line is schematically shown.

In case of objective derivation of the distortion transfer function, the output of the display device, e.g. a CRT device, is collected by e.g. a high quality digital camera. The collected data are employed to analyze the non-uniformity characteristics of the display device. The steepness of the staircase signal output is a measure of the picture sharpness, and the amplitude difference between two neighboring stairs of the staircase signal output is a measure for the picture contrast. By comparing the output and input, one can estimate the non-uniformity characteristics of the display device.

There are many methods to estimate the non-uniformity characteristics of the display device, e.g. the least squares as a maximum likelihood estimator (cf. book: "Numerical Recipes in C" ISBN 0 521 43108 5). The estimated model is a function of the pixel positions (row and column). For this modeling, as many measurement data as possible should be employed so that a reliable model can be achieved.

Finally, the distortion transfer function is employed to derive the pre-distortion transfer function.

Figure 4:
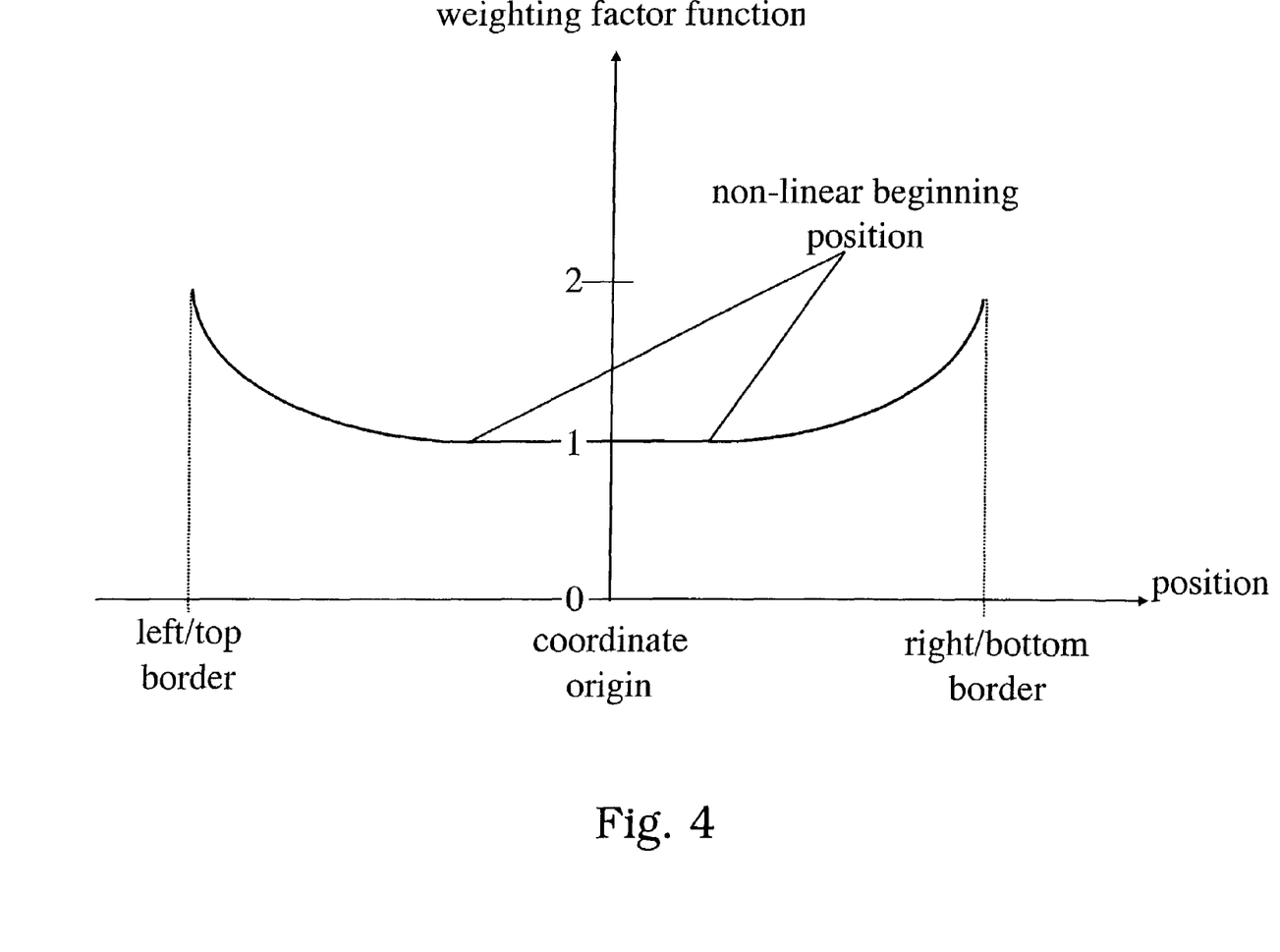
FIG. 4 is a one-dimensional representation of a weighting function, which might be used as a basis for deriving a pre-distortion operation/function according to the present invention.

One can also subjectively approximate the desired pre-distortion function. For example, one employs a weighting curve as shown in FIG. 4 to amplify the sharpness/contrast of the input signal for instance in the border regions.

To illustrate this method, this figure only shows the one-dimensional case. In practice, a two-dimensional weighting curve should be employed. The constant part of the weighting curve envisages processing the central area of a picture so that the signals in the central area remain unchanged. The non-linear part of the weighting curve envisages enhancing the signals in other picture areas.

The output of the display device is subjectively evaluated. The weighting curve will be tuned with respect to the weighting factor and the beginning position of the non-linearity of the weighting curve, until a satisfying subjective evaluation result is achieved. For one type of the display devices, one needs to adjust the weighting curve only once.

Above, an example for the weighting curve is given. One can also apply a weighting curve that can be described mathematically, e.g. the two-dimensional Gaussian function.

Objective and subjective derivation of the distortion transfer function have been discussed. In practice, these two methods can be combined to derive the distortion transfer function. That is, one at first derives the pre-distortion transfer function objectively, and the result is further adjusted by subjective evaluation.

Because of the non-linear characteristics of human visual system, the subjective deriving method is determinative.

As already mentioned, some geometrical image processing procedures can also cause non-uniformity. This factor should also be taken into account for the derivation of the pre-distortion transfer function. In the regions where higher enhancement amount is desired, the pre-distortion transfer function should be additionally modified.

Because the pre-distortion is carried out by a function, one can lower the memory requirement. Of course, one can also realize this weighting curve by means of LUT, if memory is not of principal interest for the application in question.

The implementation of the above non-uniformity correction method will be discussed in the following. One can implement the non-uniformity correction as an extra image processing function. One can also incorporate it into other image processing functions. The latter approach is preferred in this invention application.

As one of the alternatives, one can add the non-uniformity correction to the available enhancement methods. Sharpness/contrast enhancement function is usually implemented in e.g. TV set. The usual sharpness/contrast enhancement functions are with respect to the signal frequency or signal amplitude. For example, the well-known "unsharp masking" method aims at increasing image high frequency components and improving the image sharpness. However, they do not take into account the non-uniform characteristics of the display device. Thus, in order to avoid the non-uniformity artifact, one can add the spatial-varying information to the usual sharpness/contrast enhancement functions. That is, besides the should-be enhancement amount, additional enhancement amount is added to the image enhancement for the regions where more enhancement amount is desired, for example in image border areas. This additional enhancement amount is determined by the estimated pre-distortion transfer function.

As another alternative, one can add the sharpness/contrast non-uniformity correction function to the geometrical image modification processing, like pincushion distortion correction. The usual pincushion distortion correction does not include sharpness/contrast enhancement functions. By adding the sharpness/contrast non-uniformity correction function to the geometrical image modification, one can also eliminate the sharpness/contrast non-uniformity artifact of the display device.

Although above the non-uniformity correction is discussed with respect to picture sharpness and contrast. This procedure also holds for other kind of corrections, such as brightness non-uniformity correction, color non-uniformity correction.

The present invention inter alia covers the following aspects:
  A video display device, which is characterized by the non-uniformity correction function, in particular by the sharpness/contrast non-uniformity correction function.
  The non-uniformity correction function is not only with respect to brightness non-uniformity correction, color non-uniformity correction, but also with respect to sharpness non-uniformity correction, contrast non-uniformity correction.
  Non-uniformity correction can be realized by a map or LUT storing the non-uniformity correction data, as well as by a mathematical function, which needs less memory than the map or LUT approach.
  The derivation of the pre-distortion function/data also takes into account the non-uniformity caused by the image processing, e.g. the geometrical image processing, besides the imperfect or unexpected manufacturing technology of the display device.
  The non-uniformity correction function is incorporated into the usual image post-processing function, e.g. the geometrical image modification, or into the sharpness/contrast enhancement functions, so that the implementation complexity can be reduced.
  The current video display devices, like TV sets, do not include non-uniformity correction function. After the envisaged non-uniformity correction, video display device will have uniform performance over the whole screen. Non-uniformity correction can be carried out regarding many display characteristics, such as brightness non-uniformity, color non-uniformity, sharpness non-uniformity, contrast non-uniformity and so on. The non-uniformity correction can be realized by a LUT or map as described by the already know approaches. It can also be realized by a mathematical function, e.g. two-dimensional Gaussian function, so that one can reduce memory amount. Although the non-uniformity correction can be realized as a separate function as did by the state of the art, it can also be incorporated into other image post-processing functions In the following, the invention will be explained in more detail by taking reference to the accompanying figures.

In the following, similar and/or equivalent features are denoted by the same reference symbols and a detailed description thereof is not repeated in each case of their occurrence.

FIG. 1 is a schematical block diagram demonstrating some of the basic ideas behind the present invention.

On the left hand side of FIG. 1, a source for primary image data PID is shown which is adapted to supply said primary image data PID to a section where a pre-distortion operation PDO is performed. As a result of said pre-distortion operation said primary image data PID are transformed into secondary image data SID which are supplied to a display device or display section upon the action of which a distortion operation DO is performed on said secondary image data SID so as to output and obtain an image I.

It is a basic aspect of the present invention that said pre-distortion operation PDO is designed and chosen in a way that combining the distortion operation of DO of the display device and the pre-distortion PDO operation of the pre-processing method annihilate or compensate each other so as to yield an image output I with an increased uniformity over the whole area of the picture or image which is displayed by the display device.

Figure 2:
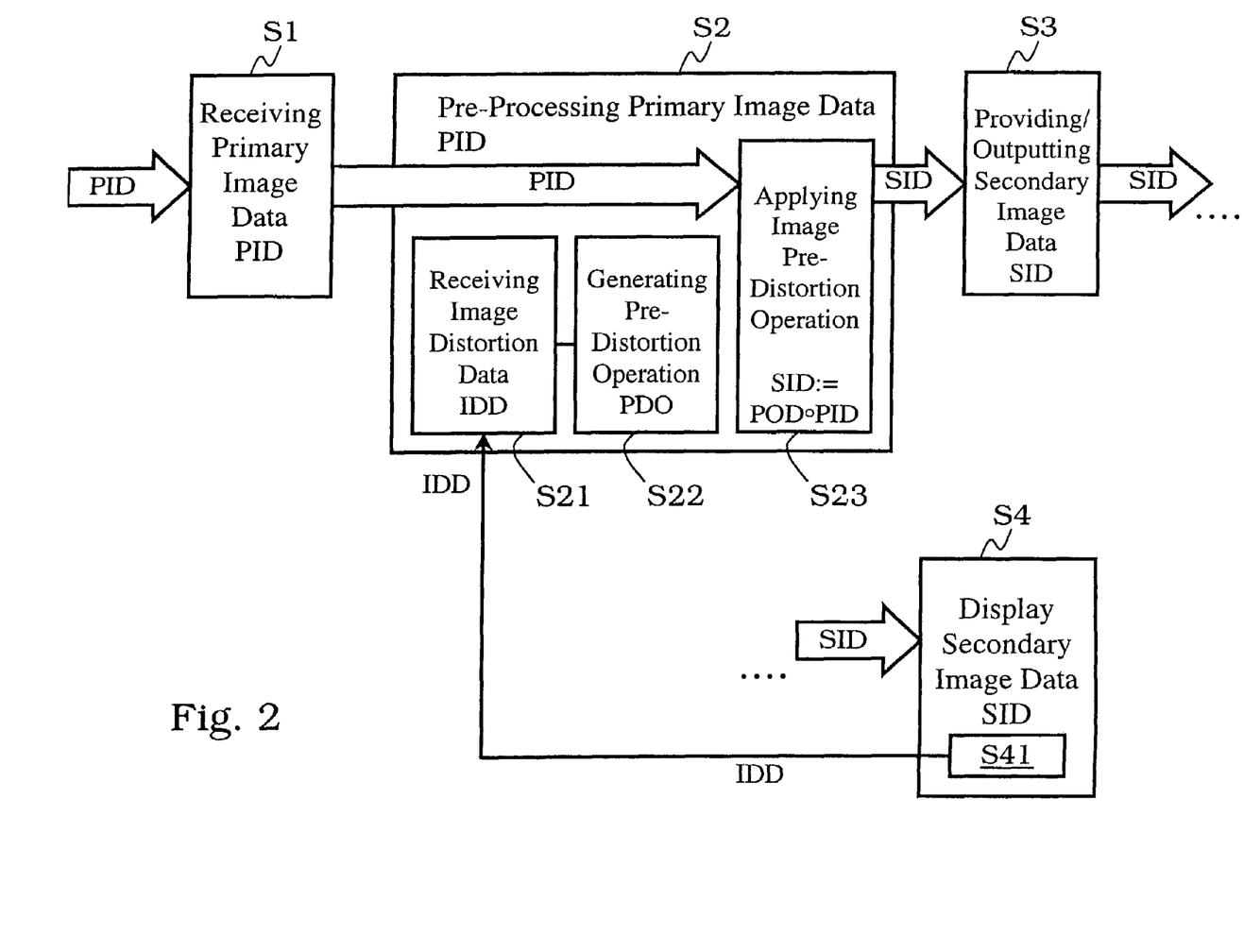
FIG. 2 is a schematical block diagram of a preferred embodiment of the inventive method for pre-processing image data.

FIG. 2 is a schematical block diagram of a preferred embodiment of the inventive method for pre-processing image data.

In a first step S1 primary image data PID are received and in the following supplied to a second step S2 of pre-processing said primary image data PID so as to obtain pre-processed secondary image data SID which are then in a third step S3 provided/output as input data for following processing steps or in the example of FIG. 2 as input data for a displaying step S4.

To realize the process of pre-distorting PDO in sub-step S22 it is prior to said step S22 necessary to receive, obtain and/or generate data with respect to said pre-distortion operation PDO to be performed.

These data may be called image distortion data IDD and they may descriptive and/or representative for the actual distortion process or distortion operation DO of the displaying process S4. These image distortion data IDD may contain the actual displayed image I derived during a measurement process S41 that are then compared to the image data or primary image data PID to be displayed during step S21, Based on the comparison result the pre-distortion operation PDO may be constructed. On the other hand, it is also possible to use certain parameters as said image distortion data IDD on the basis of which the actual pre-distortion operation PDO is chosen from a set of pre-defined pre-distortion operations PDO and/or adapted so as to minimize the image defects in the sense of non-uniform properties by adding an adapted and/or improved pre-distortion operation PDO.

In the situation shown in FIG. 2 said image distortion data IDD may be obtained by a measuring process S41 with respect to the displayed image I during the displayed process S4. Therefore, according to FIG. 2 objective criteria are generated and fed back to step S21 of receiving said image distortion data and step S22 of providing and/or generating said pre-distortion operation POD which is then applied to said primary image data PID within said step S23.

Figure 3A:
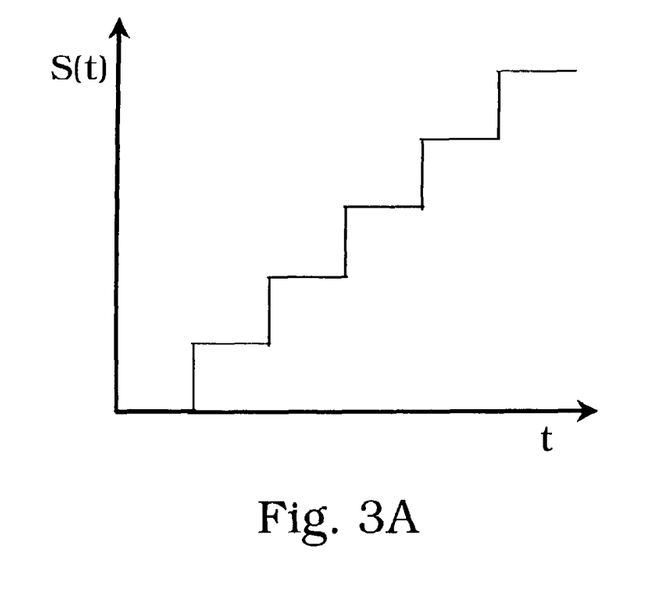
FIG. 3A, B show two examples for waveforms used as test image data or test input signals within the inventive method for pre-processing image data.
Figure 3B:
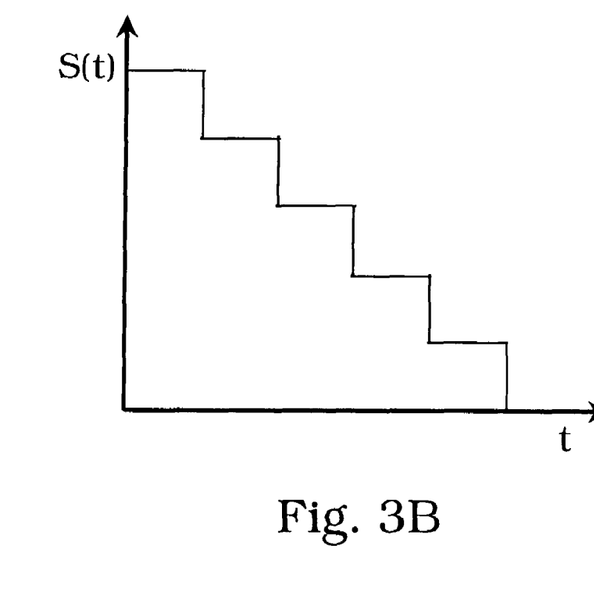

FIGS. 3A and 3B demonstrate examples for test functions or test images TI which might be used for adjusting the feedback loop shown in FIG. 2. FIG. 3A shows a increasing stare case function as a waveform which may serve as a signal part in the active columns of an active TV scanning line or the like. FIG. 3B in contrast shows a decreasing stare case function for such a waveform.

Finally, FIG. 4 shows an example for a possible pre-distortion function PDF having a two-dimensional shape, i.e., showing weighting factors as a function of X-, Y-coordinates within the displayed image. As can be seen from FIG. 4, in an area around the coordinates' origin a linear relationship having a constant weighting factor of the value 1 is given. In contrast, in the boundary areas of the left, right, top and bottom or borders the weighting factor increases in a non-linear manner so as to compensate for non-linearities and/or non-uniform properties of the display process and/or of the display device in question.

Such a weighting factor function shown in FIG. 4 may also be used for a subjective approximation of a desired pre-distortion function as a pre-distortion operation PDO.

The non-uniformity correction can be included within or be performed together with an image processing function.

REFERENCE SYMBOLS

DF distortion function
$DF^{-1}$ inverse/inverted distortion function
DO distortion operation
$DO^{-1}$ inverse/inverted distortion operation
I image, image to be displayed
id identical operation (or intentionally distorted operation)
IDD image distortion data
IDF inverse/inverted distortion function
IDO inverse/inverted distortion operation
PDF pre-distortion function
PDO pre-distortion operation
PID primary image data
SID secondary image data
S1 step/process of receiving PID
S2 step/process of pre-processing PID
S3 step/process of providing/outputting SID
S4 step/process of displaying and/or generating image data to be displayed
S21 step/process of receiving IDD
S22 step/process of receiving, generating and/or providing PDO
S23 step/process of applying PDO to PID

The invention claimed is:

1. A method for pre-processing image data, comprising steps of:
   receiving primary image data corresponding to an image or a sequence of images to be displayed;
   pre-processing said primary image data by applying a pre-distortion operation to said primary image data so as to obtain secondary image data; and
   outputting said secondary image data to a display process as data to be displayed, wherein said pre-distortion operation is configured to correspond to an inverse (IDO) of a distortion operation of a display process to be used for displaying said secondary image data and said pre-distortion operation is designed to describe parameters for sharpness, contrast, brightness or color of a display device.

2. The method according to claim 1,
   wherein said pre-distortion operation PDO and said distortion operation DO fulfill the relation $$DO \cdot PDO = id$$

and/or the relation $$DO \cdot PDO \approx id,$$

with id denoting an identical operation and/or a desired operation to match to human perception and/or to a human visual system.

3. The method according to claim 1,
   wherein said pre-distortion operation PDO and said distortion operation DO fulfill the relation $$PDO = IDO = DO^{-1}$$

and/or the relation $$PDO \approx IDO = DO^{-1},$$

with $DO^{-1}$ and IDO denoting an inverted operation with respect to said distortion operation DO.

4. The method according to claim 1, wherein said pre-distortion operation (PDO) is completely or in part based on and/or defined by a pre-distortion function (PDF) in implicit or in explicit form.

5. The method according to claim 1, wherein said pre-distortion operation (PDO) is completely or in part based on and/or defined by a pre-distortion lookup table (PDL).

6. The method according to claim 1, comprising a step of receiving, providing and/or generating said pre-distortion operation (PDO) and said pre-distortion function (PDF).

7. The method according to claim 6, wherein said step of providing and/or generating said pre-distortion operation (PDO) use and/or are based on image distortion data (IDD) being representative or descriptive for said distortion operation (DO) and/or for said distortion function (DF), which are obtained during a step of acquiring image distortion data (IDD).

8. The method according to claim 1, wherein said pre-distortion operation (PDO), said pre-distortion function (PDF) and/or said image distortion data (IDD) are determined by using at least one test function or test image (TI), represented by an increasing and/or decreasing staircase function of well-defined and predefined parameters.

9. The method according to claim 1, wherein said pre-distortion operation (PDO), said pre-distortion function (PDF) and/or said image distortion data (IDD) are determined by an objective measurement process, within said step of acquiring said image distortion data (IDD).

10. The method according to claim 1, wherein said pre-distortion operation (PDO), said pre-distortion function (PDF) and/or said image distortion data (IDD) are determined and/or adapted by an iterative process and/or by a feedback process.

11. A system or apparatus for processing image data, which is configured to realize and/or to perform the method for pre-processing image data according to claim 1.

12. The system or apparatus according to claim 11, wherein said system or apparatus is configured to realize and/or perform the method for pre-processing said image data within or together with a process of image processing, geometrical image processing, image post-processing, sharpness and/or contrast enhancement processing.

13. A computer readable storage medium encoded with instructions, which when executed by a computer or digital signal processing unit causes the computer or the digital signal processing unit to perform and/or to realize the method for pre-processing image data according to claim 1.

14. A method for pre-processing image data, comprising steps of:
receiving primary image data corresponding to an image or a sequence of images to be displayed;
pre-processing said primary image data by applying a pre-distortion operation to said primary image data so as to obtain secondary image data; and
outputting said secondary image data to an image generation process to be performed as data to be transformed into said image to be displayed,
wherein said pre-distortion operation is configured to correspond to an inverse of a distortion operation of an image generation process to be used for transforming said secondary image data into said image to be displayed and said pre-distortion operation is designed to describe parameters for sharpness, contrast, brightness or color of a display device.

15. The method according to claim 14,
wherein said pre-distortion operation PDO and said distortion operation DO fulfill the relation $$DO \cdot PDO = id$$

and/or the relation $$DO \cdot PDO \approx id,$$

with id denoting an identical operation and/or a desired operation to match to human perception and/or to a human visual system.

16. The method according to claim 14,
wherein said pre-distortion operation PDO and said distortion operation DO fulfill the relation $$PDO = DO = DO^{-1}$$

and/or the relation $$PDO \approx IDO = DO^{-1},$$

with $DO^{-1}$ and IDO denoting an inverted operation with respect to said distortion operation DO.

17. The method according to claim 14, wherein said pre-distortion operation (PDO) is completely or in part based on and/or defined by a pre-distortion function (PDF) in implicit or in explicit form.

18. The method according to claim 14, wherein said pre-distortion operation (PDO) is completely or in part based on and/or defined by a pre-distortion lookup table (PDL).

19. The method according to claim 14, comprising a step of receiving, providing and/or generating said pre-distortion operation (PDO) and said pre-distortion function (PDF).

20. The method according to claim 19, wherein said step of providing and/or generating said pre-distortion operation (PDO) use and/or are based on image distortion data (IDD) being representative or descriptive for said distortion operation (DO) and/or for said distortion function (DF), which are obtained during a step of acquiring said image distortion data (IDD).

21. The method according to claim 14, wherein said pre-distortion operation (PDO), said pre-distortion function (PDF) and/or said image distortion data (IDD) are determined by using at least one test function or test image (TI), represented by an increasing and/or decreasing staircase function of well-defined and predefined parameters.

22. The method according to claim 14, wherein said pre-distortion operation (PDO), said pre-distortion function (PDF) and/or said image distortion data (IDD) are determined by an objective measurement process, within said step of acquiring said image distortion data (IDD).

23. The method according to claim 14, wherein said pre-distortion operation (PDO), said pre-distortion function (PDF) and/or said image distortion data (IDD) are determined and/or adapted by an iterative process and/or by a feedback process.

24. A system or apparatus for processing image data, which is configured to realize and/or to perform the method for pre-processing image data according to claim 14.

25. The system or apparatus according to claim 24, wherein said system or apparatus is configured to realize and/or perform the method for pre-processing said image data within or together with a process of image processing, geometrical image processing, image post-processing, sharpness and/or contrast enhancement processing.

26. A computer readable storage medium encoded with instructions, which when executed by a computer or digital signal processing unit causes the computer or the digital signal processing unit to perform and/or to realize the method for pre-processing image data according to claim 14.

* * * * *